INVENTOR
WALTER J. CMIEL
BY
Charles L. Lorenshek
attorney

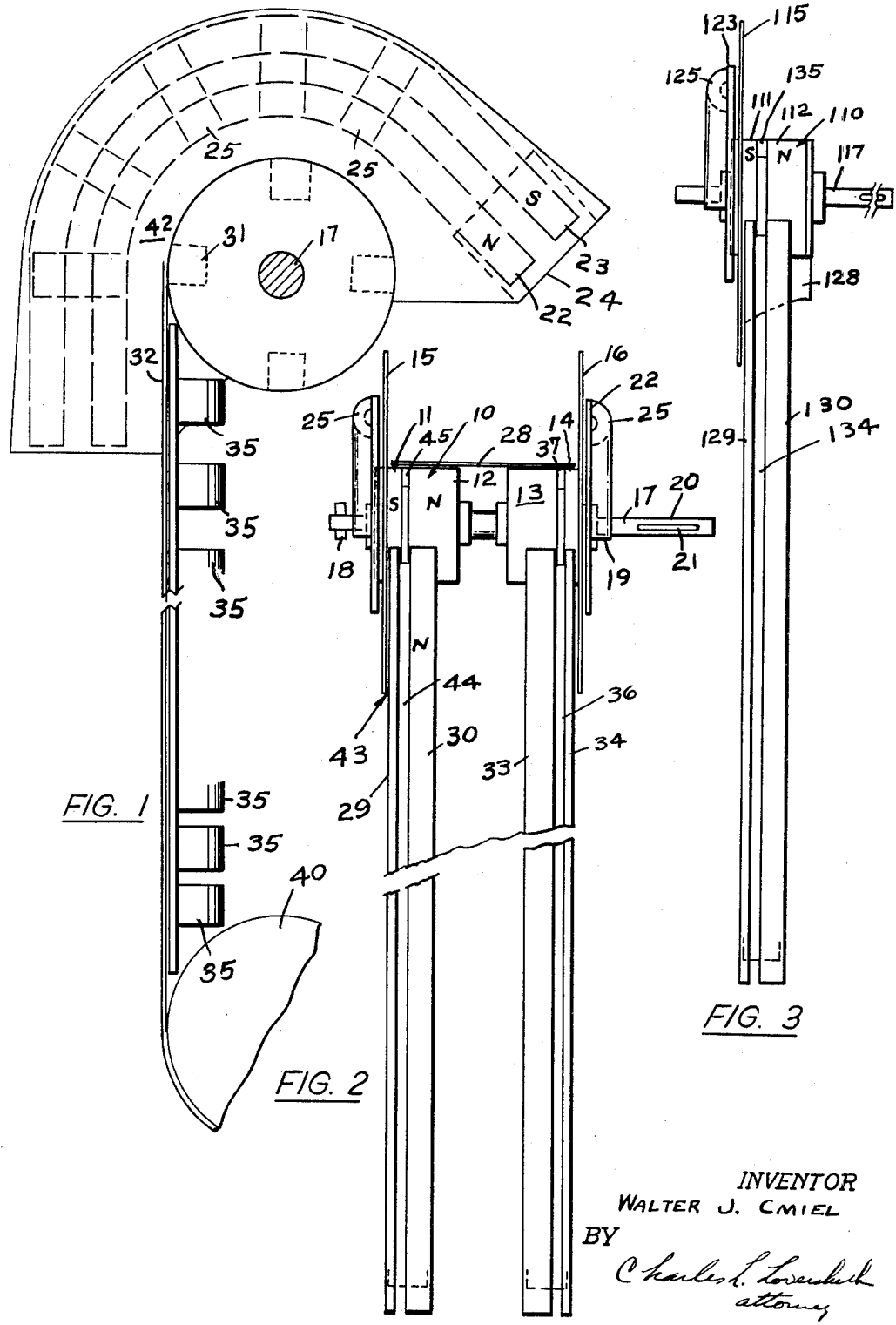

United States Patent Office

3,120,891
Patented Feb. 11, 1964

3,120,891
MAGNETIC CONVEYOR WITH IMPROVED
FLANGED ROLL
Walter J. Cmiel, Wattsburg, Pa., assignor to Eriez Manufacturing Co., Erie, Pa., a corporation of Pennsylvania
Filed Jan. 19, 1961, Ser. No. 83,714
7 Claims. (Cl. 198—41)

This invention relates to conveyors and, more particularly, to magnetic conveyors.

The magnetic roll disclosed herein was developed to facilitate the conveying, controlling while conveying, and inverting of heavy tall steel cans, both when filled and when unfilled. This magnetic device enables a can processor or user to turn or invert steel or iron cans to an upside down position, change direction of movement thereof, and otherwise control the cans without the aid of other mechanical devices and mechanical guides.

This invention was conceived as a result of the difficulty encountered with the handling of cans at high speeds. The problem was solved by mild steel disks attached to a magnetic roll. These disks serve as auxiliary pole pieces by inducing magnetic fields over their entire height. Rails or pole pieces act on the can bottoms to hold them magnetically on the conveyor.

More particularly, it is an object of the present invention to provide a magnetic means for inverting steel "tin" cans, can lids, and different objects, including cans of steel with non-magnetic components, to an inverted position or to a new changed position.

Another object of the invention is to provide a conveyor which will invert tall and heavy cans and which will convey such cans in inverted positions.

Still another object of the invention is to provide a machine which will reduce the scratching of cans which would ordinarily result with the use of existing mechanical "turn over" devices.

Yet another object of the invention is to provide a machine will smoothly, continuously, and efficiently handle cans and move them to and from the magnetic turning device.

A further object of the invention is to provide a machine which will handle individual cans as well as groups of cans, thus eliminating the pushing of cans by other cans to maintain continuous flow.

Yet a further object of the invention is to provide a machine which will invert cans and center them on the conveyance during all turning operations.

It is a further object of the invention to provide means in a magnetic roll for driving a conveyor through a belt, chain, or the like in a recessed groove to permit closer proximity to the metal can with the magnetic field.

Still a further object of the invention is to provide a flange with a non-slip, non-scratching surface to eliminate the marking of cans or to reduce the slippage thereof.

Still yet a further object of the invention is to provide a magnetic conveyor for cans which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a schematic side view of a magnetic conveyor according to the invention;

FIG. 2 is a top view of a part of the conveyor;

FIG. 3 is a partial top view of another embodiment of the invention;

Figures 4, 5:
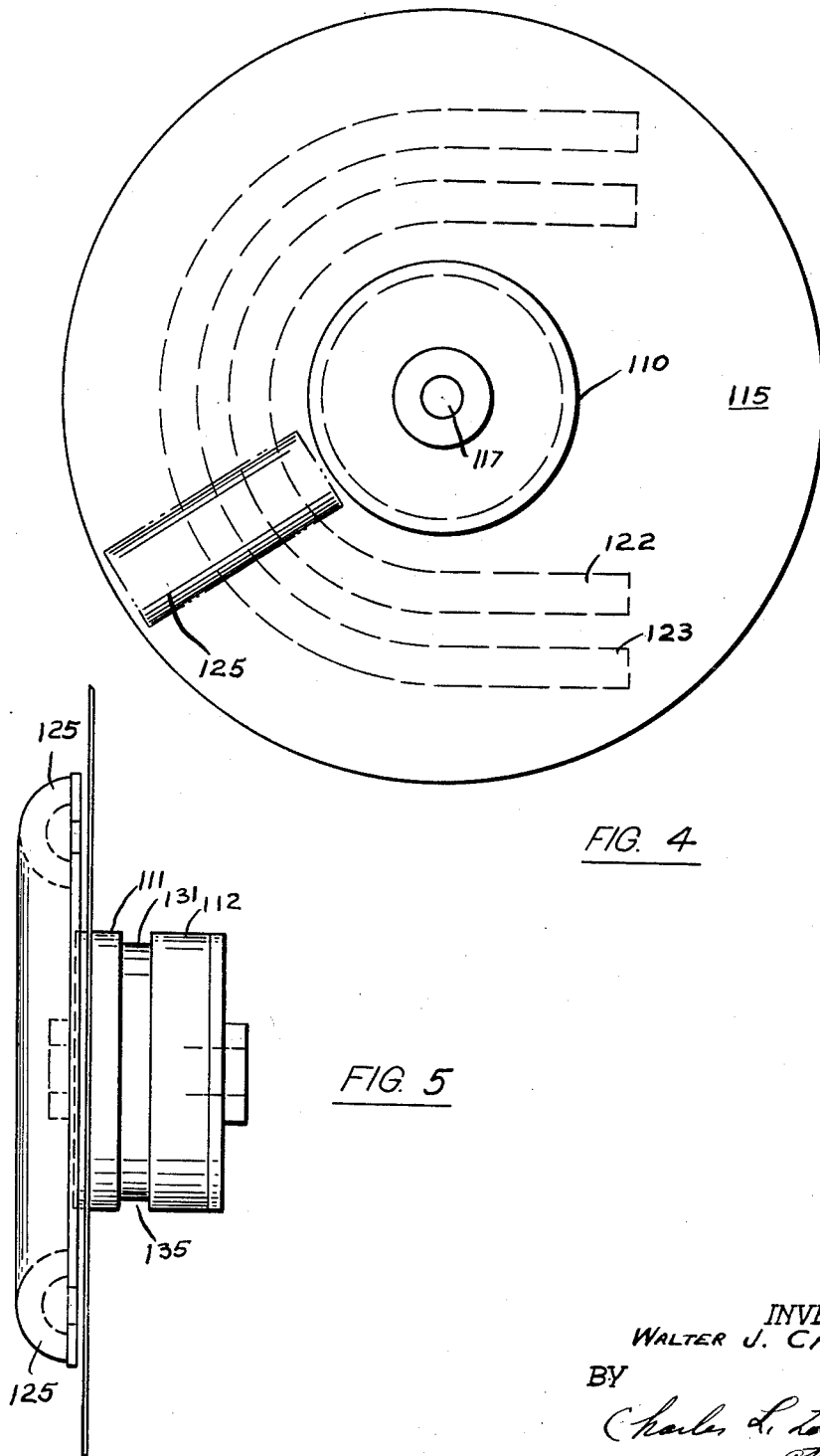
FIG. 4 is an enlarged schematic side view of one of the disks.
FIG. 5 is an enlarged schematic top view of one of the disks and related parts according to the invention.

Now with more particular reference to the drawings, the conveyor shown in FIGS. 1 and 2 is made up of a magnetic drum 10 having spaced, annular, magnetic cylindrical members 11, 12, 13, and 14 supported thereon and rotatable therewith. Attached to the magnetic cylindrical members 11 and 14 are non-magnetic disks 15 and 16, respectively, which may be made of brass, stainless steel, or similar non-magnetic material. The disks 15 and 16 are concentrically disposed relative to the cylindrical members 11 and 14 and attached thereto to rotate therewith.

A shaft 17 which supports the drum made of the cylindrical members 12, 13, 11, and 14 is carried in bearings 18 and 19 which may be attached to a suitable support. The shaft 17 may have a suitable pulley attached to an end 20 and fixed against rotation thereto by means of a keyway 21 so that the drum may be driven.

Magnetic plate like pole members 22 and 23 are in the form of spaced plates made of magnetic material and extending alongside the path of the cans on the conveyor. The members 22 and 23 are supported to a non-magnetic fixed base member 24 which may be attached to the fixed frame. The pole members 22 and 23 are disposed in a plane perpendicular to the axis of the shaft 17. They are curved around a center of curvature on the axis of the shaft 17. The plate like pole members 22 and 23 are disposed in a plane perpendicular to the plane of the conveyor and the plane of the top surface of a conveyor belt 32. The members 22 and 23 have spaced horseshoe shaped magnets 25 attached thereto and the legs of the magnets 25 extend radially from the shaft 17.

It will be seen that the pole members 22 and 23 having the horseshoe magnets 25 attached thereto are fixed against rotation to the frame while the assembly made up of the shaft 17, cylindrical members 11, 12, 13, and 14, and a belt 28 rotate as a unit. The belt 28 is made of flexible non-magnetic material and it extends over the tops of rails 29 and 30 to carry the material being conveyed. The rails 29 and 30 are disposed tangent to the hollow cylindrical members 11 and 12 and adjacent the outer edges of the rails 29 and 34.

The cylindrical members 11 and 12 have bar magnets 31 attached to the inner periphery thereof, one end of each bar magnet being attached to each hollow cylindrical member 11 and 12.

The top part of the conveyor belt 32 slides over the tops of the rails 29, 30, 33, and 34. The rails 29 and 34 are relatively narrow while the rails 30 and 33 are relatively wide as indicated. These rails are rectangular in cross section and a plurality of horseshoe shaped permanent magnets 35 are provided which have one leg thereof attached to the rail 29 and the other leg attached to the rail 30 so that the rail 29 may be induced to a south pole while the rail 30 may be induced to a north pole. A gap 44 between the rails 29 and 30 must be approximately equal in width to a gap 45 between the cylindrical members 11 and 12 while a gap 36 between the rails 33 and 34 must be generally equal to a gap 37 between the cylindrical members 13 and 14. The drums 10 and 40 are shown spaced from each other schematically. They could be supported in many other ways by suitable bearings.

When it is desired to convey cans on the conveyor, they may be set on the belt 32. They will be held to the belt and the cans can be conveyed along the top of the belt. Cans could even be conveyed underneath the belt with the device in inverted position and held thereto by the rails 29 and 30 which have magnetic fields induced therein by the magnet 35. When the cans come to the position 42, the magnets 25 will hold the cans over to the side against the non-magnetic disk 15 and they will be held against this disk by pole members 22 and 23 as they move around a curved path having its center of curvature on the shaft 17 and will thus be discharged below the drum 10.

In the embodiment of the invention shown in FIGS. 3, 4, and 5, a single assembly is shown wherein rails 129 and 130 correspond to the rails 29 and 30 in FIG. 2 and cylindrical members 111 and 112 correspond to the members 11 and 12 in FIG. 2. These members have permanent bar magnets attached to the inside thereof bridging a gap 135 in the manner that the magnets 31 in FIG. 1 are used. The assembly is supported on a shaft 117 which will be carried in suitable bearings.

A non-magnetic plate 115 is fixed to rotate with a drum 110 and magnetic members 122 and 123 have permanent magnets 125 fixed thereto and they induce magnetic fields in the members 122 and 123. A suitable belt indicated at 128 is disposed around the drum 110 and extends around a drum spaced therefrom and rests along the rails 129 and 130 which have a gap 134 therebetween.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor comprising a drum, means supporting said drum for rotation about an axis, axially spaced first and second cylindrical members on said drum concentric to the axis thereof, means magnetizing said cylindrical members to give said first cylindrical member a north polarity and said second cylindrical member a south polarity, spaced first and second rails made of magnetic material, said rails being disposed in a plane parallel to the axis of rotation of said drum and disposed generally tangent thereto, means magnetizing said rails to render one a north polarity and the other a south polarity, said first rail being disposed adjacent said first cylindrical member and said second rail adjacent said second cylindrical member, conveyor means supported on said drum and slidable on said rails, a first and a second plate like pole member disposed in a curved path around the central axis of said drum with a center of curvature of said curved path being at said axis, one said pole member being spaced radially outwardly of the other, said pole members being disposed in a plane perpendicular to said axis of said drum and perpendicular to the plane of said rails and at the outer edge of one said rail, and means magnetizing said pole members to render one a north polarity and the other a south polarity.

2. The conveyor recited in claim 1 wherein a drum is spaced from said first mentioned drum and a belt is disposed around said drums and runs on said rails.

3. The conveyor recited in claim 1 wherein a disk made of non-magnetic material is fixed to said drum concentric thereto and between said pole members and said cylindrical members.

4. The conveyor recited in claim 1 wherein said means magnetizing said cylindrical members comprises bar magnets, each having the north pole thereof attached to one said cylindrical member and the south pole attached to the other.

5. The conveyor recited in claim 4 wherein said means magnetizing said rails comprises U-shaped permanent magnets, each having its north pole attached to one said rail and its south pole attached to the other said rail.

6. The conveyor recited in claim 5 wherein said means magnetizing said pole members comprises spaced U-shaped permanent magnets.

7. In combination, a conveyor for cans having a straight part disposed in a plane and a curved part being an extension of said straight part and merging with said straight part and means to support said cans on said parts, two spaced plates each disposed in a plane perpendicular to the plane of said straight part of said conveyor and extending around said curved part perpendicular to said straight part, said spaced plates being positioned adjacent the lateral edges of said conveyor whereby said plates act as guides for cans on said conveyor, and means to magnetize said plates, said magnetizing means comprising horseshoe shaped permanent magnets each having one leg attached to each said plate.

References Cited in the file of this patent

UNITED STATES PATENTS

| | | |
|---|---|---|
| 2,708,022 | Pettigrew | May 10, 1955 |
| 2,875,565 | Roskelley | Mar. 3, 1959 |
| 2,881,901 | Zimmer | Apr. 14, 1959 |
| 2,960,319 | Carvallo | Nov. 15, 1960 |

FOREIGN PATENTS

| | | |
|---|---|---|
| 642,099 | Germany | Feb. 22, 1937 |